US012725798B2

United States Patent
(12) Ohsawa et al.

(10) Patent No.: US 12,725,798 B2
(45) Date of Patent: Sep. 1, 2026

(54) POSITIVE ELECTRODE ACTIVE MATERIAL, BATTERY, AND METHOD OF MANUFACTURING POSITIVE ELECTRODE ACTIVE MATERIAL

(71) Applicant: TOYOTA JIDOSHA KABUSHIKI KAISHA, Toyota (JP)

(72) Inventors: Ryosuke Ohsawa, Okazaki (JP); Takahiko Ninomiya, Miyoshi (JP); Taku Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 18/924,344

(22) Filed: Oct. 23, 2024

(65) Prior Publication Data

US 2025/0140841 A1 May 1, 2025

(30) Foreign Application Priority Data

Oct. 25, 2023 (JP) ................................ 2023-183570

(51) Int. Cl.
*H01M 4/525* (2010.01)
*C01G 53/50* (2025.01)

(52) U.S. Cl.
CPC ............ *H01M 4/525* (2013.01); *C01G 53/50* (2013.01); *C01P 2002/50* (2013.01); *C01P 2006/40* (2013.01)

(58) Field of Classification Search
CPC ........... H01M 4/525; H01M 2004/028; H01M 4/505; H01M 10/0525; H01M 2004/021; C01G 53/50; C01G 53/82; C01P 2002/50; C01P 2006/40; Y02E 60/10
See application file for complete search history.

(56) References Cited

U.S. PATENT DOCUMENTS

2018/0316000 A1 11/2018 Sugiura et al.
2021/0305568 A1 9/2021 Kanada et al.
2022/0181675 A1 6/2022 Dou et al.
2024/0136515 A1* 4/2024 Lee ........................ H01M 4/364

FOREIGN PATENT DOCUMENTS

JP 6359323 B2 7/2018
JP 2018-186036 A 11/2018
JP 2020-021684 A 2/2020
(Continued)

*Primary Examiner* — Mark Kopec
*Assistant Examiner* — Jaison P Thomas
(74) *Attorney, Agent, or Firm* — Oliff PLC

(57) ABSTRACT

A positive electrode active material having a composition represented by $Li_xNi_aCo_bMn_cM_dO_2$, wherein, when an inner region, which extends 70% of a diameter from a center of a particle of the positive electrode active material, in a TEM-EDX image of a cross-section of the particle is sectioned into square regions of 10 nm, a proportion of regions at which a concentration of an element represented by M is greater than or equal to 10 mass %, with respect to all regions, is greater than or equal to 1.0%, and in the composition, $0.1 \leq x \leq 1.5$, $0.5 \leq a \leq 1.0$, $0 \leq b \leq 0.3$, $0 \leq c \leq 0.3$, $a+b+c=1.0$, $0.0005 \leq d \leq 0.05$, and M represents at least one element selected from the group consisting of Ta, Al, Ba, Pr, La, Y, Sr, Ce, Se, Hf, Rh and Zr.

9 Claims, 3 Drawing Sheets

(56) References Cited

FOREIGN PATENT DOCUMENTS

| | | | |
|---|---|---|---|
| JP | 2021-007092 | A | 1/2021 |
| JP | 2021-018974 | A | 2/2021 |
| JP | 2021-114436 | A | 8/2021 |
| JP | 2021-147314 | A | 9/2021 |
| WO | 2022/131573 | A1 | 6/2022 |

* cited by examiner

4A 2
20
4A 6
2
20
4A 4B
2
4B

POSITIVE ELECTRODE ACTIVE MATERIAL, BATTERY, AND METHOD OF MANUFACTURING POSITIVE ELECTRODE ACTIVE MATERIAL

CROSS-REFERENCE TO RELATED APPLICATION

This application is based on and claims priority under 35 USC 119 from Japanese Patent Application No. 2023-183570 filed on Oct. 25, 2023, the disclosure of which is incorporated by reference herein.

BACKGROUND

Technical Field

The present disclosure relates to a positive electrode active material, a battery, and a method of manufacturing a positive electrode active material.

Related Art

Conventionally, the addition of various added elements to positive electrode active materials that are used in batteries has been carried out for the purposes of improving the resistance characteristic of the battery and the like.

For example, Japanese Patent Application Laid-Open (JP-A) No. 2021-147314 discloses transition metal complex hydroxide particles containing nickel (Ni), manganese (Mn), cobalt (Co) and element (A) in a ratio of substance amounts of Ni:Mn:Co:A=x:y:z:t (x+y+z=1, 0.3≤x≤0.95, 0.05≤y≤0.55, 0≤z≤0.4, 0<t≤0.1, where element A is at least one element selected from Mg, Ca, Al, Ti, V, Cr, Zr, Nb, Mo, La, Hf, Ta and W), and having a central portion containing primary particles, and an outer shell portion disposed at the outer side of the central portion and at which the primary particles are disposed more densely than at the central portion, wherein the abundance (th) of element A in the central portion is smaller than the abundance (ts) of element A in the outer shell portion.

Further, Japanese Patent No. 6359323 discloses a surface-modified lithium-containing complex oxide used for the positive electrode of a lithium ion secondary battery, in which the surface of a lithium-containing complex oxide expressed by general formula $(Li_{1+x}(CO_{(1-a-b-m)}Ni_aAl_bM_m)_{1-x}O_{2-(f/2)}F_f)$ is modified by a surface-modifying compound containing at least one element selected from the group consisting of group S1 and group S2 elements, wherein: group S1 is a group consisting of Al, Zr, Ti, Mg, Zn, Nb, Mo, Ta, W and rare earth elements; group S2 is a group consisting of F, P and S; M is at least one type of element selected from the group consisting of transition metals other than Co and Ni, and Sn, Ge, Na, K, B, C, Si, P, S, Zn, Ga, Bi, and alkaline earth metals and rare earth elements; and −0.05≤x≤0.05, 0<a≤0.25, 0<b≤0.05, 0≤m≤0.04 and 0≤f≤0.05.

SUMMARY

In batteries containing conventionally-used positive electrode active materials, there are cases in which the battery resistance rises after charging/discharging cycles are repeated, and it is desirable to suppress an increase in the battery resistance also after charging/discharging cycles, i.e., to improve the cycling characteristic.

The present disclosure was made in view of the above-described circumstances, and an object thereof is to provide a positive electrode active material that can improve the cycling characteristic when used in a battery, and a battery containing the positive electrode active material, and a method of manufacturing the positive electrode active material.

Means for addressing the above-described topic include the following aspects.

A positive electrode active material of a first aspect of the present disclosure having a composition represented by $Li_xNi_aCo_bMn_cM_dO_2$, wherein:

- when an inner region, which extends 70% of a diameter from a center of a particle of the positive electrode active material, in a TEM-EDX image of a cross-section of the particle is sectioned into square regions of 10 nm, a proportion of regions at which a concentration of an element represented by M is greater than or equal to 10 mass %, with respect to all regions, is greater than or equal to 1.0%, and
- in the composition, 0.1≤x≤1.5, 0.5≤a≤1.0, 0≤b≤0.3, 0≤c≤0.3, a+b+c=1.0, 0.0005≤d≤0.05, and M represents at least one element selected from the group consisting of Ta, Al, Ba, Pr, La, Y, Sr, Ce, Se, Hf, Rh and Zr.

The positive electrode active material of a second aspect according to the present disclosure is the positive electrode active material of the first aspect, wherein the element represented by M is at least one element selected from the group consisting of Ta, Al, Ba, Pr and La.

The positive electrode active material of a third aspect according to the present disclosure is the positive electrode active material of the second aspect, wherein the element represented by M is La.

The positive electrode active material of a fourth aspect according to the present disclosure is the positive electrode active material of any one of the first aspect to the third aspect, wherein the proportion of the regions at which the concentration of the element represented by M is greater than or equal to 10 mass %, with respect to all regions, is greater than or equal to 3.0%.

A battery of a fifth aspect according to the present disclosure, including the positive electrode active material of any one of the first aspect to the forth aspect.

A method of manufacturing a positive electrode active material of a sixth aspect according to the present disclosure, the method including:

- a step of preparing a solution A, in which is dissolved a raw material containing an element represented by M;
- a step of preparing a solution B, in which are dissolved raw materials respectively containing Ni, Co and Mn;
- a step of adding the solution A into an alkaline solution, and precipitating a hydroxide;
- a step of adding the solution B into the alkaline solution in which the hydroxide has precipitated, and obtaining a precipitate;
- a step of collecting the precipitate from the alkaline solution;
- a step of mixing the precipitate, and a raw material that contains Li, and obtaining a mixture; and
- a step of firing the mixture,
- wherein M represents at least one element selected from the group consisting of Ta, Al, Ba, Pr, La, Y, Sr, Ce, Se, Hf, Rh and Zr.

In accordance with the present disclosure, there are provided a positive electrode active material that can improve the cycling characteristic when used in a battery, and a battery containing the positive electrode active material, and a method of manufacturing the positive electrode active material.

DETAILED DESCRIPTION

Figure 1:
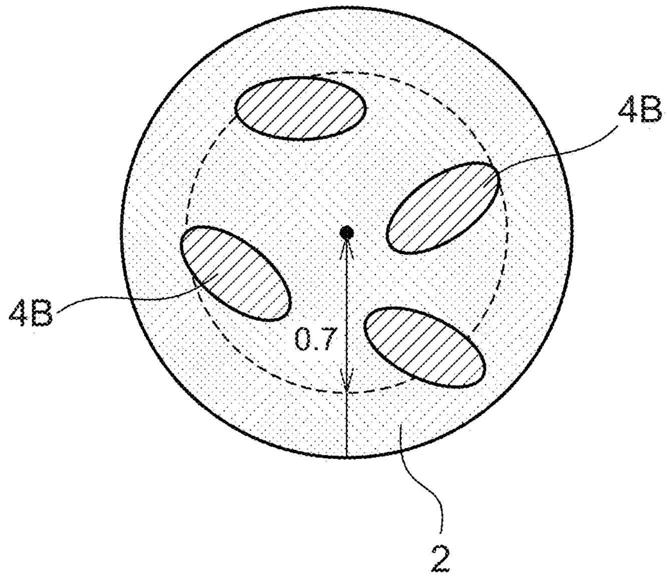
FIG. 1 is schematic sectional view for explaining a method of measuring uneven distribution rate of element M in a positive electrode active material relating to an embodiment of the present disclosure.

Embodiments that are examples of the present disclosure are described hereinafter. The description thereof and the Examples exemplify embodiments and do not limit the scope of the invention.

In numerical value ranges that are expressed in a stepwise manner in the present specification, the maximum value or the minimum value listed in a given numerical value range may be substituted by the maximum value or the minimum value of another numerical value range that is expressed in a stepwise manner. Further, in the numerical value ranges put forth in the present specification, the maximum value or the minimum value of a given numerical value range may be substituted by a value set forth in the Examples.

Each component may contain plural types of the corresponding material. When listing the amounts of the respective components within a composition, in a case in which there are plural types of materials that correspond to a component within the composition, the amount of that component means the total amount of the plural types of materials existing within the composition, unless otherwise indicated.

"Step" is not only an independent step and includes steps that, even in a case in which that step cannot be clearly distinguished from another step, achieve the intended object of that step.

<Positive Electrode Active Material>

A positive electrode active material relating to an embodiment of the present disclosure has the composition represented by $Li_xNi_aCo_bMn_cM_dO_2$.

When the inner region, which extends 70% of the diameter from the center of a particle of the positive electrode active material, in a TEM-EDX (Transmission Electron Microscope-Energy Dispersive X-ray Spectroscopy) image of a cross-section of the particle is sectioned into square regions of 10 nm, the proportion of regions where the concentration of the element represented by M is greater than or equal to 10 mass % (hereinafter also simply called "uneven distribution rate of element M"), with respect to all of the regions, is greater than or equal to 1.0%.

(In the above composition, $0.1 \le x \le 1.0$, $0.5 \le a \le 1.0$, $0 \le b \le 0.3$, $0 \le c \le 0.3$, $a+b+c=1.0$, $0.0005 \le d \le 0.05$, and M represents at least one element selected from the group consisting of Ta, Al, Ba, Pr, La, Y, Sr, Ce, Se, Hf, Rh and Zr).

Conventionally, added elements (i.e., elements represented by M, also called "element M" hereinafter) have been added to positive electrode active materials for the purposes of improving the resistance characteristic of batteries, and the like. Note that, conventionally, the added element (element M) exists in a state of being distributed unevenly toward the surface of (i.e., in a state of forming a coated layer on the surface of) the particle of the positive electrode active material.

Further, in batteries using such a conventional positive electrode active material, there are cases in which the battery resistance rises after charging/discharging cycles are repeated. Therefore, it is desirable to suppress an increase in battery resistance also after charging/discharging cycles are repeated, i.e., to improve the cycling characteristic.

In the positive electrode active material relating to the embodiment of the present disclosure, the uneven distribution rate of element M is greater than or equal to 1.0%. In other words, in a particle of the positive electrode active material, the added element (element M) exists in a state of being sufficiently dispersed all the way to the inner region. Due to a sufficient amount of element M existing at the inner region, the effect of stabilizing the layered structure greatly improves. As a result thereof, mixing of Ni (cation mixing) into the Li layer during charging/discharging at the battery is suppressed, and impeding of movement of the Li ions at times of charging/discharging is suppressed. Due thereto, the cycling characteristic of a battery using the positive electrode active material can be improved.

Details of the positive electrode active material relating to the embodiment of the present disclosure are described next.

(Composition)

The positive electrode active material relating to the embodiment of the present disclosure has the composition represented by $Li_xNi_aCo_bMn_cM_dO_2$.

(In the above composition, $0.1 \le x \le 1.5$, $0.5 \le a \le 1.0$, $0 \le b \le 0.3$, $0 \le c \le 0.3$, $a+b+c=1.0$, $0.0005 \le d \le 0.05$, and M represents at least one element selected from the group consisting of Ta, Al, Ba, Pr, La, Y, Sr, Ce, Se, Hf, Rh and Zr).

In the composition of the positive electrode active material, from the standpoints of the resistance characteristic of the battery and the like, ratio x of the Li is 0.1 or more and 1.5 or less, and is preferably 0.3 or more and 1.4 or less, and is more preferably 0.5 or more and 1.2 or less.

Ratio a of the Ni is 0.5 or more and 1.0 or less, and is preferably 0.6 or more and 0.9 or less, and is more preferably 0.7 or more and 0.8 or less.

Ratio b of the Co is 0 or more and 0.3 or less, and is preferably 0 or more and 0.2 or less, and is more preferably 0.1 or more and 0.2 or less.

Ratio c of the Mn is 0 or more and 0.3 or less, and is preferably 0 or more and 0.2 or less, and is more preferably 0.1 or more and 0.2 or less.

Note that the total (a+b+c) of the ratios of the Ni, Co and Mn is 1.0.

The positive electrode active material contains, as the added element (element M), at least one element selected from the group consisting of Ta, Al, Ba, Pr, La, Y, Sr, Ce, Se, Hf, Rh and Zr. Due to the positive electrode active material containing an element that is exemplified above as the added element, the cycling characteristic of the battery, i.e., the degree of suppressing an increase in battery resistance after charging/discharging cycles are repeated, can be improved.

Note that, from the standpoint of improving the cycling characteristic, the positive electrode active material preferably contains, as the added element (element M), at least one element selected from the group consisting of Ta, Al, Ba, Pr and La, and more preferably contains La.

In the composition of the positive electrode active material, ratio d of M is 0.0005 or more and 0.05 or less, and is preferably 0.001 or more and 0.04 or less, and is more preferably 0.005 or more and 0.02 or less.

(Uneven Distribution Rate of Element M)

In the positive electrode active material relating to the embodiment of the present disclosure, when the inner region, which extends 70% of the diameter from the center of a particle of the positive electrode active material, in a TEM-EDX image of a cross-section of the particle is sectioned into square regions of 10 nm, the proportion of regions at which the concentration of the element represented by M is greater than or equal to 10 mass %, with respect to all of the regions, (the uneven distribution rate of element M) is greater than or equal to 1.0%. The uneven distribution rate of element M being greater than or equal to 1.0% means that, in the particle of the positive electrode active material, the added element (element M) exists in a state of being sufficiently dispersed all the way to the inner region, and due thereto, the cycling characteristic of a battery using the positive electrode active material can be improved.

Note that, from the standpoint of further improving the cycling characteristic of the battery, the uneven distribution rate of element M is preferably greater than or equal to 3.0%, and more preferably greater than or equal to 4.0%. On the other hand, although the maximum value of the uneven distribution rate of element M is not particularly limited, from the standpoint of keeping low the added amount of the added element (element M), the maximum value is preferably less than or equal to 15.0%, and more preferably less than or equal to 10.0%.

[Measurement of Uneven Distribution Rate of Element M]

The method of measuring the uneven distribution rate of element M at a particle of the positive electrode active material is described.

Figure 2:
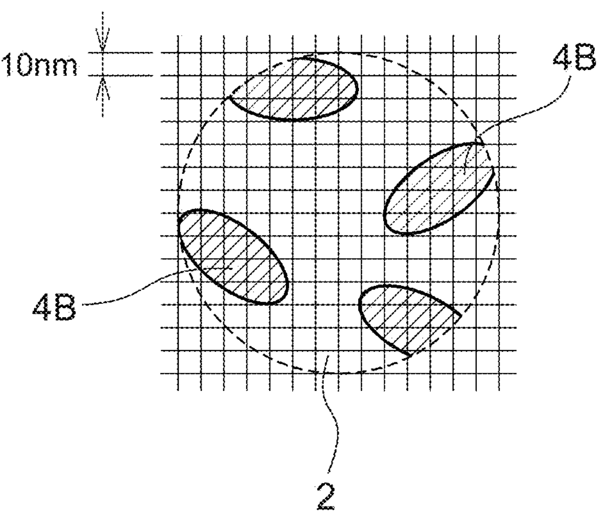
FIG. 2 is a schematic sectional view for explaining the method of measuring the uneven distribution rate of element M in the positive electrode active material relating to the embodiment of the present disclosure.

First, a TEM-EDX image of a cross-section of a particle of the positive electrode active material is captured. Here, a schematic drawing of the sectional image is illustrated in FIG. 1. Positive electrode active material particle 2 illustrated in FIG. 1 includes particles 4B of element M at the interior thereof. In this sectional image of the positive electrode active material particle 2, the inner region that extends 70% of the diameter from the center (i.e., the region that is other than the surface layer region which is 30% of the diameter from the surface, and, in FIG. 1, the inner side region surrounded by the dashed line) is the subject of observation. As illustrated in FIG. 2, this inner region is sectioned into square regions of 10 nm, and the concentration of element M is measured at each region.

However, regions that are not filled by the positive electrode active material particle 2 exist at the sectioned square regions of 10 nm that exist at the edge of the inner region (the inner side region surrounded by the dashed line in FIG. 1). Therefore, among the sectioned square regions of 10 nm, the regions that are not completely filled in by the positive electrode active material particle 2 are excluded as subjects, and only regions where the entire range thereof is filled in by the positive electrode active material particle 2 are subjects of measurement. Further, the proportion of regions at which the concentration of element M is greater than or equal to 10 mass %, among all of the sectioned square regions of 10 nm (except for the regions that are not filled in by the positive electrode active material particle 2), is calculated. This proportion is calculated by the following formula.

proportion=number of regions which the concentration of element $M$ is greater than or equal to 10 mass %/number of all of the sectioned square regions of 10 nm (except for the regions not filled in by the positive electrode active material particle) at the inner region×100.

This calculation of the proportion is carried out on sectional images of 10 positive electrode active material particles, and the arithmetic mean value thereof is used as the uneven distribution rate of element M.

<Method of Manufacturing Positive Electrode Active Material>

A method of manufacturing a positive electrode active material relating to an embodiment of the present disclosure is described next. Note that the above-described positive electrode active material relating to an embodiment of the present disclosure can be manufactured by the method of manufacturing a positive electrode active material that relates to an embodiment of the present disclosure and is described hereinafter.

The method of manufacturing a positive electrode active material relating to the embodiment of the present disclosure has following steps (1)~(7):

(1) a step of preparing solution A in which is dissolved a raw material containing an element represented by M (note that M represents at least one element selected from the group consisting of Ta, Al, Ba, Pr, La, Y, Sr, Ce, Se, Hf, Rh and Zr);

(2) a step of preparing solution B in which are dissolved raw materials containing Ni, Co and Mn, respectively;

(3) a step of adding solution A into an alkaline solution, and precipitating a hydroxide;

(4) a step of adding solution B into the alkaline solution in which the hydroxide has precipitated, and obtaining a precipitate;

(5) a step of collecting the precipitate from the alkaline solution;

(6) a step of mixing the precipitate, and a raw material that contains Li, and obtaining a mixture; and (7) a step of firing the mixture.

(1) Step of Preparing Solution A in which is Dissolved a Raw Material Containing an Element Represented by M First, solution A, in which is dissolved a raw material containing an added element (element M, i.e., at least one element selected from the group consisting of Ta, Al, Ba, Pr, La, Y, Sr, Ce, Se, Hf, Rh and Zr), is prepared.

For example, solution A can be prepared by dissolving a raw material, which contains element M, in a solvent such as water or the like. The concentration of solution A is preferably made to be in the range of 5~30 mass % for example.

Examples of raw materials that contain element M are sulfates such as $Ta(SO_4)_2$ and the like as a raw material that contains Ta, sulfates such as $Al_2(SO_4)_3$ and the like as a raw material that contains Al, sulfates such as $BaSO_4$ and the like as a raw material that contains Ba, sulfates such as $Pr_2(SO_4)_3$ and the like as a raw material that contains Pr, and sulfates such as $La_2(SO_4)_3$ and the like as a raw material that contains La. Raw materials that are generally used can be used as the raw material that contains an element M that is other than these, and examples are sulfates and the like that contain any of various types of element M.

(2) Step of Preparing Solution B in which are Dissolved Raw Materials Containing Ni, Co and Mn, Respectively Solution B, in which are dissolved a raw material containing Ni, a raw material containing Co and a raw material containing Mn, is prepared.

For example, solution B can be prepared by dissolving, in a solvent such as water or the like, a raw material containing Ni, a raw material containing Co and a raw material containing Mn. The concentration of solution B is preferably made to be in the range of 10~40 mass % for example. The ratio of the Ni/Co/Mn, with respect to Nil, is preferably made to be a ratio of 1.0/0.8~1.2/0.8~1.2 (atm %).

Sulfates such as $NiSO_4$ and the like are examples of the raw material containing Ni. Sulfates such as $CoSO_4$ and the like are examples of the raw material containing Co. Sulfates such as $MnSO_4$ and the like are examples of the raw material containing Mn.

(3) Step of Adding Solution A into an Alkaline Solution, and Precipitating a Hydroxide Next, solution A (the solution in which a raw material that contains element M is dissolved) is added into an alkaline solution, and a hydroxide is precipitated.

Figures 3A, 3B, 3C, 3D:
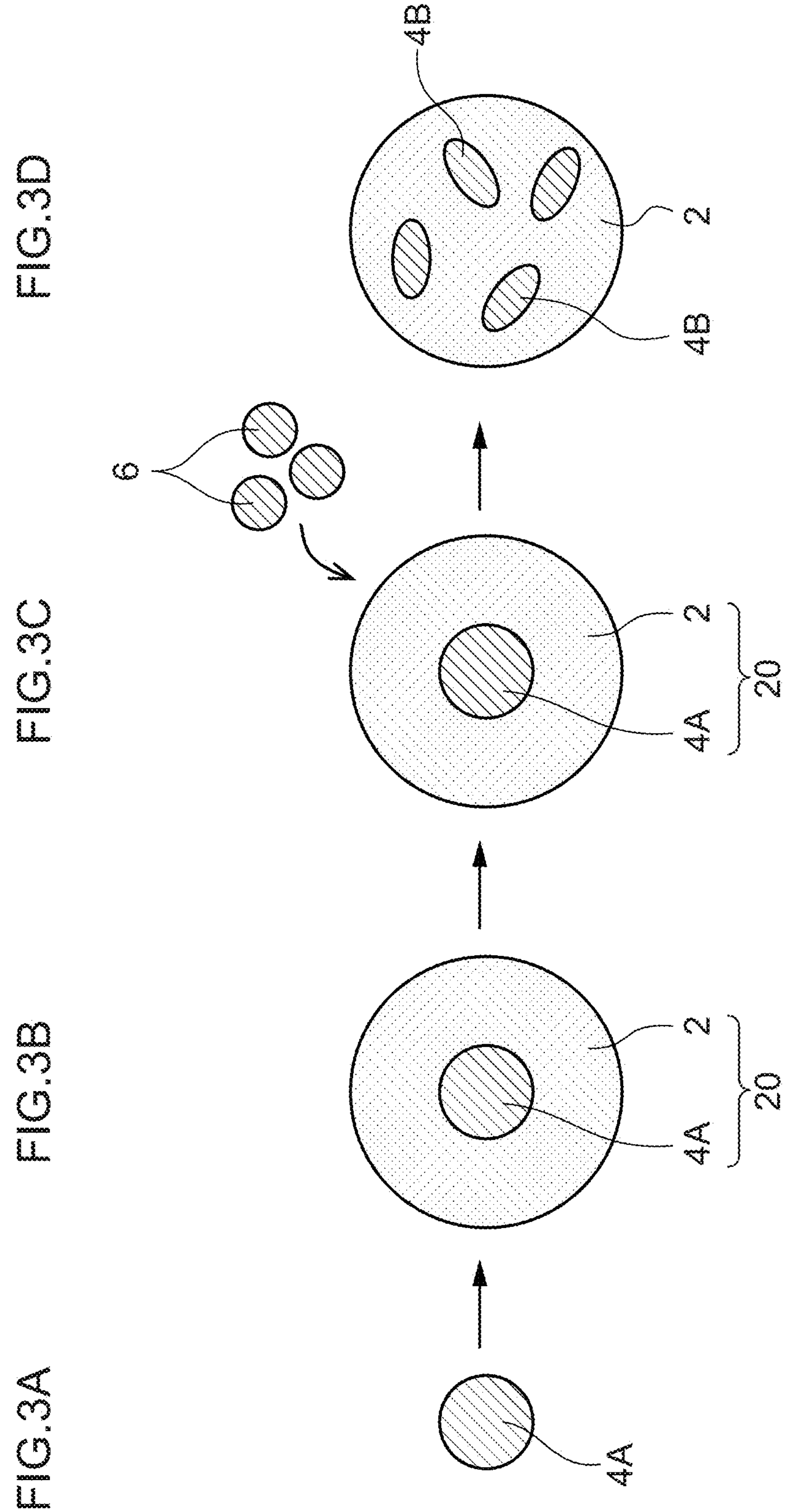
FIGS. 3A-3D are schematic sectional views for explaining a method of manufacturing the positive electrode active material relating to the embodiment of the present disclosure.

Here, the method of manufacturing a positive electrode active material relating to the embodiment of the present disclosure is described by using FIGS. 3A-3D. By adding solution A into an alkaline solution and precipitating a hydroxide, as shown in FIG. 3A, nucleus 4A of the additive (element M) can be formed.

In this step, for example, an $NH_3$ aqueous solution is nitrogen-substituted, and the pH is adjusted so as to become alkaline, and by adding solution A in drops while controlling the pH to a constant level (e.g., a pH of 10~12), a hydroxide (i.e., the nucleus 4A of the additive in FIGS. 3A-3D) can be precipitated.

(4) Step of Adding Solution B into the Alkaline Solution in which the Hydroxide has Precipitated, and Obtaining a Precipitate Next, solution B is added into the alkaline solution, in which a hydroxide (the nucleus 4A of the additive) has precipitated, and a precipitate is obtained. By further adding solution B into the alkaline solution in which the hydroxide has precipitated, as shown in FIG. 3B, a particle 20, in which a hydroxide 2 containing Ni, Co and Mn is generated at the periphery of the nucleus 4A of the additive (element M), crystallizes, and this particle 20 is obtained as the precipitate.

In this step, for example, by adding solution B and $NH_3$ in drops while controlling the pH of the alkaline solution, in which the hydroxide has precipitated, to a constant level (e.g., a pH of 10~12), a hydroxide of transition metals is precipitated.

(5) Step of Collecting the Precipitate from the Alkaline Solution Next, the Precipitate is Collected from the Alkaline Solution.

A method of filtering and rinsing is an example of the method of collecting the particles of the precipitate. An example is a method in which, first, the precipitate (particles) are removed by filtering and are rinsed, and then the liquid used in the rinsing is filtered, and the precipitate (particles) are removed. Note that the precipitate (particles) after the rinsing may further be dried.

(6) Step of Mixing Precipitate, and Raw Material that Contains Li, and Obtaining a Mixture Next, as shown in FIG. 3C, the collected precipitate (i.e., the particle 20 at which the hydroxide 2, which contains Ni, Co and Mn, is generated at the periphery of the nucleus 4A of the additive), and raw material 6 that contains Li, are mixed together. For example, particles of the collected precipitate, and a raw material containing Li, can be mixed together in a mortar.

Examples of the raw material that contains Li are $Li_2CO_3$, LiOH and the like.

(7) Step of Firing Mixture

Next, the mixture of the collected precipitate (i.e., the particles 20) and the raw material 6 that contains Li is fired. For example, the mixture can be fired in a firing furnace (a muffle furnace or the like). The conditions for the firing can be made to be, for example, a temperature of 800° C.~1100° C., an oxygen atmosphere, a time of 5 hours~20 hours, or the like.

Further, after the above-described firing (hereinafter called "first firing"), it is preferable to carry out a firing at a lower temperature (hereinafter called "second firing"). For example, particles that have undergone the first firing can be crushed, and a reducing agent (e.g., ascorbic acid) can be mixed together with the crushed particles, and this mixture can be fired in a firing furnace (a muffle furnace or the like) under a temperature that is lower than that of the first firing. The conditions for the second firing can be made to be, for example, a temperature of 400° C.~600° C., an oxygen atmosphere, a time of 5 hours~20 hours, or the like.

Due to the mixture undergoing the firing step, as shown in FIG. 3D, the additive 4B is diffused into the interior of the collected precipitate (i.e., the particle 20 at which the hydroxide 2, which contains Ni, Co and Mn, is generated at the periphery of the nucleus 4A of the additive), and at the positive electrode active material particle, the added element (element M) is present in a state of being dispersed sufficiently all the way to the inner region. As a result, the uneven distribution rate of element M in the positive electrode active material can be controlled to be within the above-described range.

<Battery>

A battery relating to an embodiment of the present disclosure contains the positive electrode active material relating to the embodiment of the present disclosure. The battery has, for example, a negative electrode, a positive electrode, a separator, and an electrolyte. The battery relating to the embodiment of the present disclosure is preferably a liquid battery containing an electrolyte liquid that is a liquid. Further, the battery may be a solid-state battery containing a solid electrolyte.

(Electrolyte Liquid)

The battery relating to the embodiment of the present disclosure preferably is a liquid battery containing an electrolyte liquid.

Solvent

The electrolyte liquid contains a solvent (a non-aqueous solvent) and an electrolyte. Examples of the solvent (non-aqueous solvent) are N,N-diethyl-N-methyl-N-(2-methoxyethyl)ammonium bis(fluorosulfonyl)imide (DEME), 1-ethyl-3-methylimidazolium bis(fluorosulfonyl)imide (EMI), 1-ethyl-2,3-dimethylimidazolium bis(fluorosulfonyl)imide (DEMI-FSI), and the like.

Electrolyte

Lithium salts are examples of the electrolyte in the electrolyte liquid. Examples of lithium salts are lithium bis(fluorosulfonyl)imide (LiFSI), $LiPF_6$ (lithium hexafluorophosphate), lithium tetrafluoroborate ($LiBF_4$), $Li[N(CF_3SO_2)_2]$, and the like.

The amount of the electrolyte may be, for example, 1.0~2.0 mol/L, and is preferably 1.0~1.5 mol/L.

In addition to the solvent and the electrolyte, the electrolyte liquid may contain various additives such as, for example, thickeners, film-forming agents, gas generating agents, and the like. The electrolyte is typically a non-aqueous electrolyte liquid that is in a liquid state at ordinary temperatures (e.g., 25±10° C.). The electrolyte liquid typically assumes a liquid state in usage environments of batteries (e.g., environments of temperatures of −20~+60° C.).

(Positive Electrode)

The positive electrode has the positive electrode active material relating to the embodiment of the present disclosure as the positive electrode active material. Details thereof have been described above, and are therefore omitted here.

Examples of a conductive material are carbon materials. The electrolyte may be a solid electrolyte or may be a liquid electrolyte. The solid electrolyte may be an organic solid electrolyte such as a gel electrolyte or the like, or may be an inorganic solid electrolyte such as an oxide solid electrolyte, a sulfide solid electrolyte, or the like. Further, the liquid electrolyte (electrolyte liquid) contains a supporting salt such as $LiPF_6$ or the like, and a solvent such as a carbonate solvent or the like. Examples of a binder are rubber binders and fluoride binders.

Further, the positive electrode preferably contains, in addition to the positive electrode active material, a solid electrolyte selected from the group of solid electrolytes consisting of sulfide solid electrolytes, oxide solid electrolytes and halide solid electrolytes. A form in which at least a portion of the surface of the positive electrode active material is covered by a sulfide solid electrolyte, an oxide solid electrolyte or a halide solid electrolyte is more preferable. $Li_{6-(4-x)b}(Ti_{1-x}Al_x)_bF_6$ ($0<x<1$, $0<b\leq1.5$) [LTAF electrolyte] is preferable as the halide solid electrolyte that covers at least a portion of the surface of the positive electrode active material.

A positive electrode collector carries out power collection of the positive electrode active material layer. Examples of the positive electrode collector are stainless steel, aluminum, nickel, iron, titanium, carbon and the like, and an aluminum alloy foil or an aluminum foil is preferable. The aluminum alloy foil and aluminum foil may be prepared by using a powder. The form of the positive electrode collector is, for example, the form of a foil or the form of a mesh.

(Negative Electrode)

A negative electrode active material layer contains at least a negative electrode active material. The negative electrode active material layer may further contain at least one of a conductive material, an electrolyte and a binder. Examples of the negative electrode active material are metal active materials such as Li, Si and the like, carbon active materials such as graphite and the like, and oxide active materials such as $Li_4Ti_5O_{12}$ and the like. The form of the negative electrode collector is, for example, the form of a foil or the form of a mesh. Content relating to the conductive material, the electrolyte and the binder is similar to that described above.

An electrolyte layer is disposed between the positive electrode active material layer and the negative electrode active material layer, and contains at least an electrolyte. The electrolyte may be a solid electrolyte or may be a liquid electrolyte. The electrolyte layer is preferably a solid electrolyte layer. The electrolyte layer may have a separator.

A negative electrode collector carries out power collection of the negative electrode active material layer. Examples of the material of the negative electrode collector are metals such as copper, SUS, nickel and the like. The form of the negative electrode collector is, for example, the form of a foil or the form of a mesh.

(Solid-State Battery)

As described above, the battery relating to the embodiment of the present disclosure is preferably a liquid battery containing an electrolyte liquid that is a liquid, but, on the other hand, may be a solid-state battery containing a solid electrolyte. The solid-state battery is described hereinafter.

Solid Electrolyte

The solid-state battery preferably contains, as the solid electrolyte, at least one type of solid electrolyte selected from the group of solid electrolytes consisting of sulfide solid electrolytes, oxide solid electrolytes and halide solid electrolytes.

The sulfide solid electrolyte preferably contains sulfur(S) as the main component that is an anion element, and further, preferably contains, for example, the element Li, element A and the element S. Element A is at least one type selected from the group consisting of P, As, Sb, Si, Ge, Sn, B, Al, Ga and In. The sulfide solid electrolyte may further contain at least one of O and a halogen element. Examples of the halogen element (X) are F, Cl, Br, I and the like. The composition of the sulfide solid electrolyte is not particularly limited, and examples are $xLi_2S\cdot(100-x)P_2S_5$ ($70\leq x\leq80$) and $yLiI\cdot zLiBr\cdot(100-y-z)(xLi_2S\cdot(1-x)P_2S_5)$ ($0.7\leq x\leq0.8$, $0\leq y\leq30$, $0\leq z\leq30$). The sulfide solid electrolyte may have the composition represented by following general formula (1).

$$Li_{4-x}Ge_{1-x}P_xS_4 (0<x<1) \quad \text{formula (1)}$$

In formula (1), at least some of the Ge may be substituted by at least one selected from the group consisting of Sb, Si, Sn, B, Al, Ga, In, Ti, Zr, V and Nb. Further, at least some of the P may be substituted by at least one selected from the group consisting of Sb, Si, Sn, B, Al, Ga, In, Ti, Zr, V and Nb. Some of the Li may be substituted by at least one selected from the group consisting of Na, K, Mg, Ca and Zn. Some of the S may be substituted by a halogen. The halogen is at least one of F, Cl, Br and I.

The oxide solid electrolyte contains oxygen (O) as the main component that is an anion element, and, for example, may contain Li, element Q (Q represents at least one of Nb, B, Al, Si, P, Ti, Zr, Mo, W and S), and O. Examples of the oxide solid electrolyte are garnet type solid electrolytes, perovskite type solid electrolytes, NASICON type solid electrolytes, Li—P—O solid electrolytes, Li—B—O solid electrolytes, and the like. Examples of garnet type solid electrolytes are $Li_7La_3Zr_2O_{12}$, $Li_{7-x}La_3(Zr_{2-x}Nb_x)O_{12}$ ($0\leq x\leq2$), $Li_5La_3Nb_2O_{12}$, and the like. Examples of perovskite type solid electrolytes are $(Li,La)TiO_3$, $(Li,La)NbO_3$, $(Li,Sr)(Ta,Zr)O_3$ and the like. Examples of NASICON type solid electrolytes are $Li(Al,Ti)(PO_4)_3$, $Li(Al,Ga)(PO_4)_3$, and the like. Examples of Li—P—O solid electrolytes are $Li_3PO_4$ and LIPON (compounds in which some of the O in $Li_3PO_4$ is substituted with N). Examples of Li—B—O solid electrolytes are $Li_3BO_3$, compounds in which some of the O in $Li_3BO_3$ is substituted with C, and the like.

As the halide solid electrolyte, solid electrolytes containing Li, M and X (M represents at least one of Ti, Al and Y, and X represents F, Cl or Br) are suitable. Specifically, $Li_{6-3z}Y_zX_6$ (X represents Cl or Br, and z satisfies $0<z<2$) and $Li_{6-(4-x)b}(Ti_{1-x}Al_x)_bF_6$ ($0<x<1$, $0<b\leq1.5$) are preferable. Among $Li_{6-3z}Y_zX_6$, from the standpoint of having excellent lithium ion conductivity, $Li_3YX_6$ (X represents Cl or Br) is more preferable, and $Li_3YCl_6$ is even more preferable. Further, from standpoints such as, for example, suppressing oxidative decomposition of the sulfide solid electrolyte and the like, it is preferable that $Li_{6-(4-x)b}(Ti_{1-x}Al_x)_bF_6$ ($0<x<1$, $0<b\leq1.5$) be contained together with a solid electrolyte such as a sulfide solid electrolyte or the like.

Solid-State Battery Structure

The structure of the solid-state battery may be a layered structure of a positive electrode/a solid electrolyte layer/a negative electrode. Solid-state batteries include so-called all-solid-state batteries that use a solid electrolyte as the electrolyte, and the solid electrolyte may contain an electrolyte liquid in an amount of less than 10 mass % with respect to the entire amount of the electrolyte. Note that the solid electrolyte may be a complex solid electrolyte containing an inorganic solid electrolyte and a polymer electrolyte.

The positive electrode has a positive electrode active material layer and a collector. The negative electrode has a negative electrode active material layer and a collector.

The solid electrolyte layer may be a single-layer structure, or may be a multilayer structure of two or more layers.

The solid-state battery may have a sectional structure for example, and the solid electrolyte layer may be a two-layer structure. The solid-state battery has a negative electrode that contains a negative electrode collector and a negative electrode active material layer, a solid electrolyte layer, and a positive electrode that contains a positive electrode collector and a positive electrode active material layer. The negative electrode active material layer contains a negative electrode active material, a conduction assistant and a binder. The positive electrode active material layer contains a coated positive electrode active material, a conduction assistant and a binder. At the coated positive electrode active material, the surface of the positive electrode active material is coated by an LTAF electrolyte or an $LiNbO_3$ electrolyte.

Further, the solid-state battery may be structured such that the layer end surfaces (side surfaces) of a layered structure of a positive electrode/a solid electrolyte layer/a negative electrode are sealed by a resin. The collector of the electrode may be a structure in which a shock-absorbing layer, an elastic layer or a PTC (Positive Temperature Coefficient) thermistor layer is disposed on the surface of the collector.

(Battery)

The laminated battery in the present disclosure is typically a lithium ion secondary battery. An example of the intended use of the battery is the power source of a vehicle such as, for example, a hybrid vehicle (HEV), a plug-in hybrid vehicle (PHEV), an electric vehicle (BEV), a gasoline-powered vehicle, a diesel-powered vehicle or the like. The battery is particularly preferably used as the power source for driving of a hybrid vehicle (HEV), a plug-in hybrid vehicle (PHEV) or an electric vehicle (BEV). Further, the battery of the present disclosure may be used as the power source of a moving body other than a vehicle (e.g., a train, a boat, an airplane), or may be used as the power source of an electronic product such as an information processing device or the like.

The present disclosure is not limited to the above-described embodiments. The above embodiments are exemplary, and all forms that have structures substantially the same as and that exhibit similar operation and effects as the technical concepts put forth in the claims of the present disclosure are included in the technical scope of the present disclosure.

EXAMPLES

The present disclosure is described hereinafter on the basis of Examples, but the present disclosure is not in any way limited to these Examples.

Example 1

(Synthesizing of Positive Electrode Active Material)

A positive electrode active material, which had a composition represented by $Li_xNi_aCo_bMn_cM_dO_2$ and in which x, a, b, c and d were in the ratio listed in Table 1 and in which the element listed in Table 1 was used as the element represented by M, was synthesized by the method of the present disclosure.

Solution of Raw Material 1

$Al_2(SO_4)_3$ was dissolved in ion-exchanged water, and a solution of raw material 1 was obtained. The concentration of the aqueous solution was adjusted to be in the range of 5~30 mass %.

Solution of Raw Material 2

$NiSO_4$, $CoSO_4$ and $MnSO_4$ were dissolved in ion-exchanged water, and a solution of raw material 2 was obtained. The ratio of the Ni/Co/Mn was 1/1/1 (atm %), and the concentration of the aqueous solution was made to be 30 mass %.

Crystallization

A given amount of an $NH_3$ aqueous solution was placed in a reaction vessel, and nitrogen substitution was carried out while stirring by a stirrer. NaOH was added into the reaction vessel, and the pH was made alkaline. Next, the solution of raw material 1 was added in drops while controlling the reaction vessel interior to a constant pH (a pH of 10~12), and a hydroxide was precipitated. Further, the solution of raw material 2 and $NH_3$ were added in drops while controlling the reaction vessel interior to a constant pH (a pH of 10~12), and a transition metal hydroxide was precipitated.

Rinsing, Filtering, Drying

The precipitated transition metal hydroxide was removed by filtering. Ion-exchanged water was added thereto and dispersed by stirring by a spoon, so as to carry out rinsing. Next, the liquid used in the rinsing was filtered, and the transition metal hydroxide was removed.

Then, the filtered-out transition metal hydroxide was dried for 16 hours at 120° C., and the moisture was evaporated.

Mixing of Li Raw Materials

The dried transition metal hydroxide, and $Li_2CO_3$ and LiOH serving as Li raw materials, were mixed together in a mortar.

Firing 1

The mixture of the transition metal hydroxide and the Li raw materials was fired for 10 hours in a firing furnace (muffle furnace) at 800~1100° C. in an oxygen atmosphere.

Firing 2

The particles obtained by firing 1 were crushed. The crushed particles and ascorbic acid (a reducing agent) were mixed together, and this mixture was fired for 10 hours in a firing furnace (muffle furnace) at 400~600° C. in an oxygen atmosphere. The positive electrode active material of Example 1 was thereby obtained.

Examples 2 Through 4

Positive electrode active materials of respective Examples were obtained in the same way as in Example 1, except that the additives used in the solution of raw material 1 of Example 1 were changed from $Al_2(SO_4)_3$ to $Ba_2SO_4$ (Example 2), $Pr_2(SO_4)_3$ (Example 3) and $La_2(SO_4)_3$ (Example 4).

Comparative Example 1

(Synthesizing of Positive Electrode Active Material)

A positive electrode active material, which had a composition represented by $Li_xNi_aCo_bMn_cO_2$ and in which x, a, b and c were in the ratio listed in Table 1, was synthesized.

Solution of Raw Material 2

$NiSO_4$, $CoSO_4$ and $MnSO_4$ were dissolved in ion-exchanged water, and a solution of raw material 2 was obtained. The ratio of the Ni/Co/Mn was 1/1/1 (atm %), and the concentration of the aqueous solution was made to be 30 mass %.

Crystallization

A given amount of an $NH_3$ aqueous solution was placed in a reaction vessel, and nitrogen substitution was carried out while stirring by a stirrer. NaOH was added into the reaction vessel, and the pH was made alkaline. Next, the solution of raw material 2 and $NH_3$ were added in drops while controlling the reaction vessel interior to a constant pH (a pH of 10~12), and a transition metal hydroxide was precipitated.

Rinsing, Filtering, Drying

The precipitated transition metal hydroxide was removed by filtering. Ion-exchanged water was added thereto and dispersed by stirring by a spoon, so as to carry out rinsing. Next, the liquid used in the rinsing was filtered, and the transition metal hydroxide was removed.

Then, the filtered-out transition metal hydroxide was dried for 16 hours at 120° C., and the moisture was evaporated.

Mixing of Li Raw Materials

The dried transition metal hydroxide, and $Li_2CO_3$ and LiOH serving as Li raw materials, were mixed together in a mortar.

Firing 1

The mixture of the transition metal hydroxide and the Li raw materials was fired for 10 hours in a firing furnace (muffle furnace) at 800~1100° C. in an oxygen atmosphere.

Firing 2

The particles obtained by firing 1 were crushed. The crushed particles and ascorbic acid (a reducing agent) were mixed together, and this mixture was fired for 10 hours in a firing furnace (muffle furnace) at 400~600° C. in an oxygen atmosphere. The positive electrode active material of Comparative Example 1 was thereby obtained.

Comparative Example 2

(Synthesizing of Positive Electrode Active Material)

A positive electrode active material, which had a composition represented by $Li_xNi_aCo_bMn_cM_dO_2$ and in which x, a, b, c and d were in the ratio listed in Table 1 and in which the element listed in Table 1 was used as the element represented by M, was synthesized by a conventional method.

Solution of Raw Material 2

$NiSO_4$, $CoSO_4$ and $MnSO_4$ were dissolved in ion-exchanged water, and a solution of raw material 2 was obtained. The ratio of the Ni/Co/Mn was 1/1/1 (atm %), and the concentration of the aqueous solution was made to be 30 mass %.

Crystallization

A given amount of an $NH_3$ aqueous solution was placed in a reaction vessel, and nitrogen substitution was carried out while stirring by a stirrer. NaOH was added into the reaction vessel, and the pH was made alkaline. Next, the solution of raw material 2 and $NH_3$ were added in drops while controlling the reaction vessel interior to a constant pH (a pH of 10~12), and a transition metal hydroxide was precipitated.

Rinsing, Filtering, Drying

The precipitated transition metal hydroxide was removed by filtering. Ion-exchanged water was added thereto and dispersed by stirring by a spoon, so as to carry out rinsing. Next, the liquid used in the rinsing was filtered, and the transition metal hydroxide was removed.

Then, the filtered-out transition metal hydroxide was dried for 16 hours at 120° C., and the moisture was evaporated.

Mixing of Li Raw Materials and Added Element

The dried transition metal hydroxide, and $Li_2CO_3$ and LiOH serving as Li raw materials, and $Ta(SO_4)_2$ serving as a compound containing an added element (element M=Ta), were mixed together in a mortar.

Firing 1

The mixture of the transition metal hydroxide and the Li raw materials was fired for 10 hours in a firing furnace (muffle furnace) at 800~ 1100° C. in an oxygen atmosphere.

Firing 2

The particles obtained by firing 1 were crushed. The crushed particles and ascorbic acid (a reducing agent) were mixed together, and this mixture was fired for 10 hours in a firing furnace (muffle furnace) at 400~ 600° C. in an oxygen atmosphere. The positive electrode active material of Comparative Example 2 was thereby obtained.

[Measuring of Uneven Distribution Rate of Element M]

TEM-EDX images of cross-sections of particles of the positive electrode active materials obtained in Examples 1 through 4 and Comparative Example 2 were captured. A schematic drawing of the sectional images is shown in FIG. 1. The positive electrode active material particle 2 illustrated in FIG. 1 includes, at the inner portion thereof, the particles 4B of element M. In the sectional image of this positive electrode active material particle 2, the inner region that extends 70% of the diameter from the center (i.e., the region that is other than the surface layer region which is 30% of the diameter from the surface, and, in FIG. 1, the inner side region surrounded by the dashed line) was the subject of observation. As illustrated in FIG. 2, this inner region was sectioned into square regions of 10 nm, and the concentration of element M was measured at each region.

However, regions that are not filled by the positive electrode active material particle 2 exist among the sectioned square regions of 10 nm that exist at the edge of the inner region. Therefore, among the sectioned square regions of 10 nm, only the regions where the entire range thereof was filled in by the positive electrode active material particle 2 were used as subjects of measurement.

Further, the proportion of regions at which the concentration of element M was greater than or equal to 10 mass %, among all of the sectioned square regions of 10 nm (except for the regions not filled in by the positive electrode active material particle 2), was calculated. This proportion was calculated by the following formula.

proportion=number of regions which the concentration of element $M$ is greater than or equal to 10 mass %/number of all of the sectioned square regions of 10 nm (except for the regions not filled in by the positive electrode active material particle) at the inner region×100

This calculation of the proportion was carried out on sectional images of 10 positive electrode active material particles, and the arithmetic mean value thereof was used as the uneven distribution rate of element M. The results thereof are shown in Table 1.

[Manufacturing of Cells]

Cells were manufactured by using the positive electrode active materials of the respective Examples and the respective Comparative Examples.

Cell Structure wound cylinder positive electrode composition: positive electrode active material/acetylene black (conductive material)/polyvinylidene fluoride=88/10/2 (mass %)

negative electrode composition: natural graphite/styrene-butadiene rubber (SBR)/carboxymethylcellulose (CMC)

electrolyte liquid composition: electrolyte=$LiPF_6$ (1M), solvent=ethylene carbonate (EC)/dimethyl carbonate (DMC)/ethyl methyl carbonate (EMC)=3/4/3 (vol %)

Manufacturing of Electrodes

A positive electrode and a negative electrode were coated onto collectors by a film applicator equipped with a film thickness adjusting function (Allgood Co., Ltd.), and drying was carried out for 5 minutes at 80° C. in a drier, and a cell was thereby manufactured.

[Measuring of Post-Cycling Resistance Increase Rate]

The battery resistances of the cells obtained in the respective Examples and Comparative Examples were measured before and after cycling under the following test conditions. The results of the proportion of the battery resistance after cycling (resistance increase rate (%)), with the battery resistance before cycling being "100%", are shown in Table 1. A resistance increase rate that is closer to 100% means that the battery characteristic is better.

test conditions: charging/discharging carried out for 300 cycles between SOC 0%~100% at a 2 C rate and at 60° C.

TABLE 1

| | Li | Ni | Co | Mn | M | | synthesizing | particle uneven distribution rate | post-cycling resistance increase rate |
|---|---|---|---|---|---|---|---|---|---|
| | x | a | b | c | type | d | method | % | % |
| Comp. Ex. 1 | 1.1 | 0.8 | 0.1 | 0.1 | — | 0 | — | — | 150 |
| Comp. Ex. 2 | | | | | Ta | 0.01 | 1 | 0.4 | 147 |
| Ex. 1 | | | | | Al | 0.01 | 2 | 4.2 | 106 |
| Ex. 2 | | | | | Ba | 0.01 | | 3.4 | 108 |
| Ex. 3 | | | | | Pr | 0.01 | | 6.9 | 104 |
| Ex. 4 | | | | | La | 0.01 | | 7.5 | 103 |

It can be understood that, as shown in Table 1, in Examples 1 through 4 in which the uneven distribution rate of element M is greater than or equal to 1.0%, the resistance increase rate after cycling can be reduced as compared with Comparative Example 2 in which the uneven distribution rate of element M is less than 1.0% and Comparative Example 1 that does not contain an added element (element M).

| Explanation of Reference Numerals | |
|---|---|
| 2 | positive electrode active material particle |
| 4A | nucleus of element M |
| 4B | particle of element M |
| 20 | particle |

What is claimed is:

1. A positive electrode active material having a composition represented by $Li_xNi_aCo_bMn_cM_dO_2$, wherein:

when an inner region, which extends 70% of a diameter from a center of a particle of the positive electrode active material, in a TEM-EDX image of a cross-section of the particle is sectioned into square regions of 10 nm, a proportion of regions at which a concentration of an element represented by M is greater than or equal to 10 mass %, with respect to all regions, is greater than or equal to 1.0%, and in the composition, $0.1 \leq x \leq 1.5$, $0.5 \leq a \leq 1.0$, $0 \leq b \leq 0.3$, $0 \leq c \leq 0.3$, $a+b+c=1.0$, $0.0005 \leq d \leq 0.05$, and M represents at least one element selected from the group consisting of Ta, Al, Ba, Pr, La, Y, Sr, Ce, Se, Hf, Rh and Zr.

2. The positive electrode active material of claim 1, wherein the element represented by M is at least one element selected from the group consisting of Ta, Al, Ba, Pr and La.

3. The positive electrode active material of claim 2, wherein the element represented by M is La.

4. The positive electrode active material of claim 1, wherein the proportion of the regions at which the concentration of the element represented by M is greater than or equal to 10 mass %, with respect to all regions, is greater than or equal to 3.0%.

5. A battery, comprising the positive electrode active material of claim 1.

6. A method of manufacturing a positive electrode active material, the method comprising:

preparing a solution A, in which is dissolved a raw material containing an element represented by M;

preparing a solution B, in which are dissolved raw materials respectively containing Ni, Co and Mn;

adding the solution A into an alkaline solution, and precipitating a hydroxide;

adding the solution B into the alkaline solution in which the hydroxide has precipitated, and obtaining a precipitate;

collecting the precipitate from the alkaline solution;

mixing the precipitate, and a raw material that contains Li, and obtaining a mixture; and firing the mixture, wherein M represents at least one element selected from the group consisting of Ta, Al, Ba, Pr, La, Y, Sr, Ce, Se, Hf, Rh and Zr.

7. A battery, comprising the positive electrode active material of claim 2.

8. A battery, comprising the positive electrode active material of claim 3.

9. A battery, comprising the positive electrode active material of claim 4.

* * * * *